Sept. 29, 1953 S. SENK 2,653,741
CLOTHES COMPARTMENT FOR AUTOMOBILES
Filed Aug. 17, 1951 3 Sheets-Sheet 1
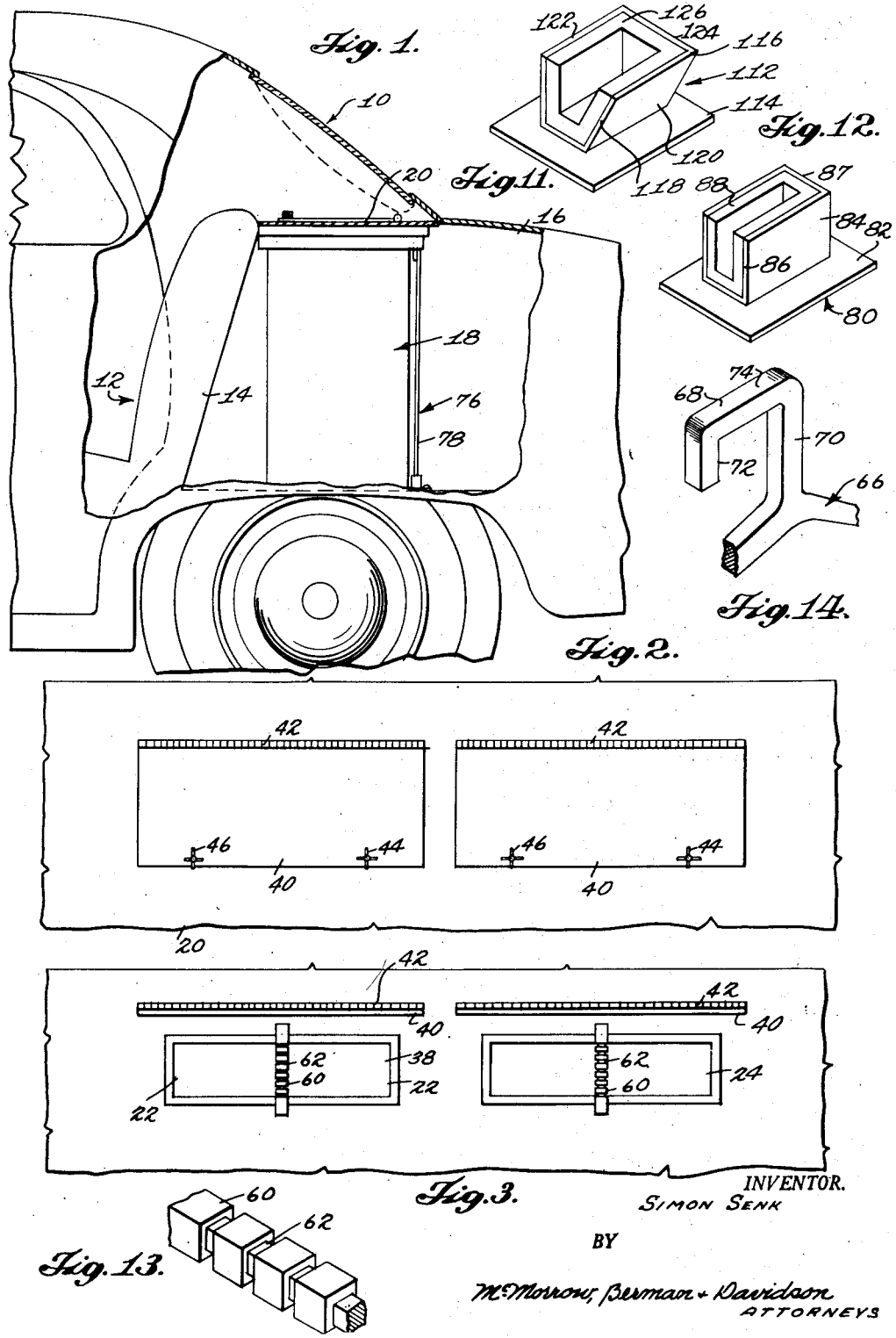
INVENTOR.
SIMON SENK
BY
McMorrow, Berman & Davidson
ATTORNEYS

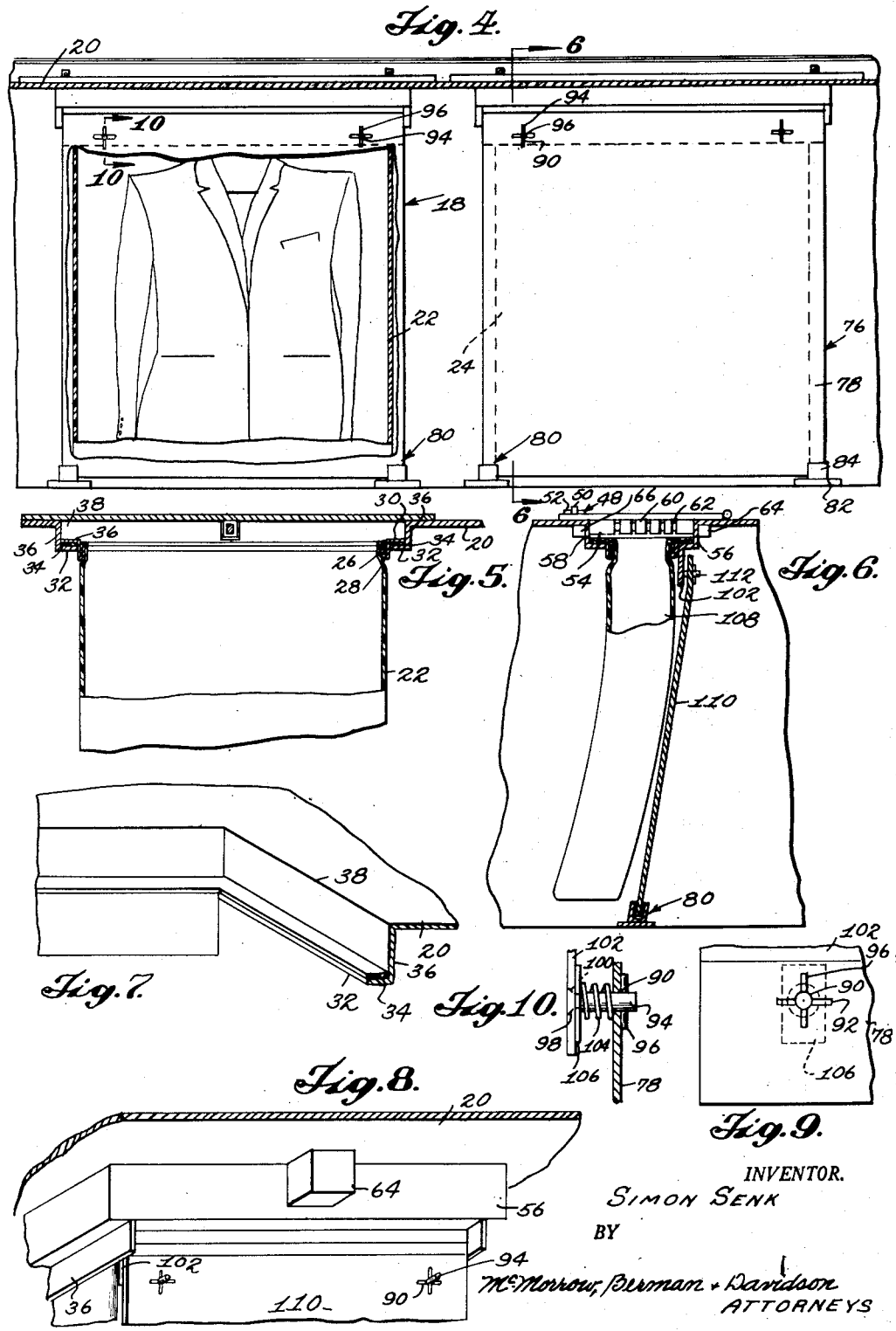

Sept. 29, 1953  S. SENK  2,653,741
CLOTHES COMPARTMENT FOR AUTOMOBILES
Filed Aug. 17, 1951  3 Sheets-Sheet 3
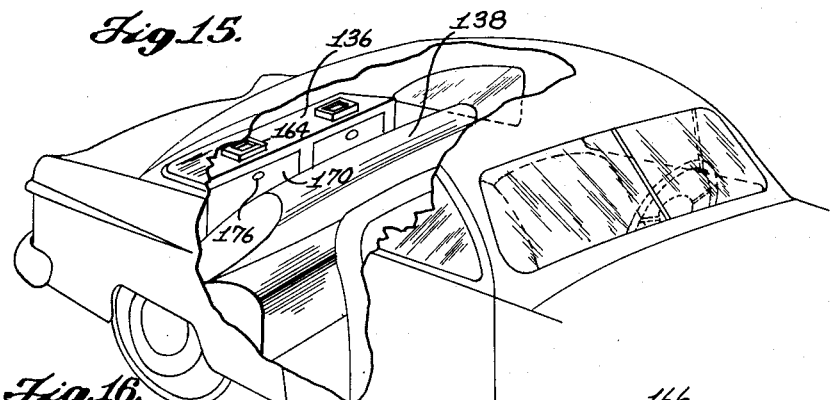
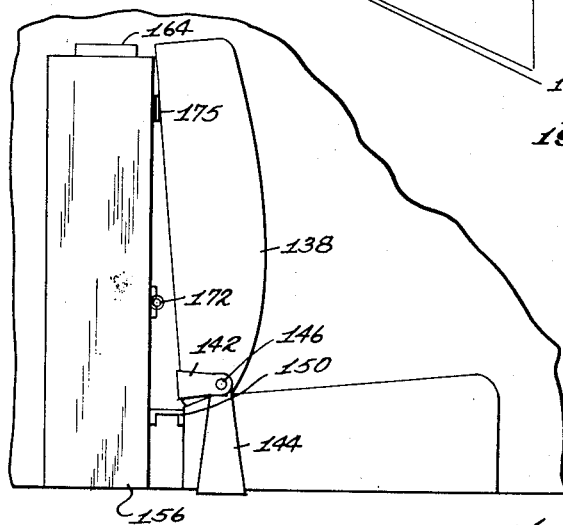
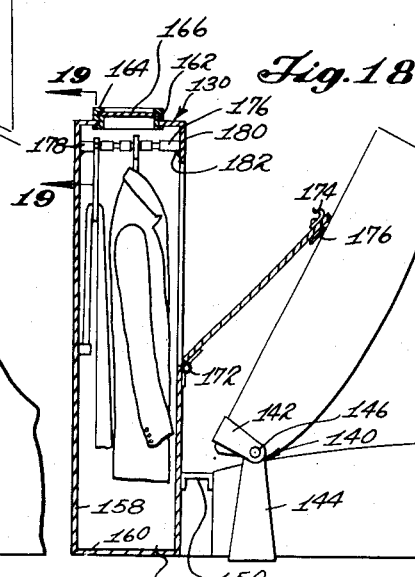
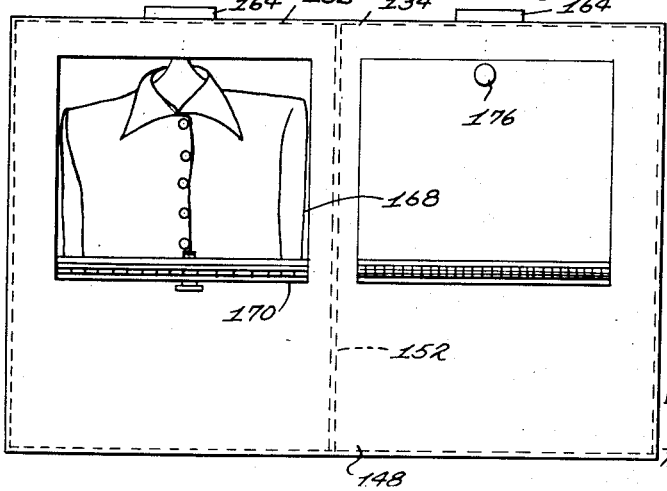
INVENTOR.
SIMON SENK
BY
McMorrow, Berman + Davidson
ATTORNEYS Patented Sept. 29, 1953

2,653,741

UNITED STATES PATENT OFFICE 2,653,741

CLOTHES COMPARTMENT FOR AUTOMOBILES

Simon Senk, Mullen, Nebr.

Application August 17, 1951, Serial No. 242,327

7 Claims. (Cl. 224—42.42)

This invention appertains to improvements in automobile wardrobes and has for its primary object to provide a clothes compartment, which is mounted rearwardly of the back rest of the back seat of an automobile in such a manner as to utilize the space directly behind the back rest as a storage space for garments.

A further object of this invention is to provide a compact clothes compartment, which is formed to accommodate a number of garments, the garments being suspended from clothes hangers, which are attached to a hanger bar within the compartment.

A further object of this invention is to provide a clothes compartment, within which garments can be stored without wrinkling, the compartment being dustproof and being provided with means to prevent damage to the garments by articles placed in the trunk compartment of the vehicle.

Yet another object of this invention is to provide a clothes compartment, which is attached to the ledge behind the back rest of the back seat of an automobile and which is easily and conveniently accessible interiorly of the automobile.

Yet another object of this invention is to provide an inexpensive, compact and efficient clothes compartment which can be removably or permanently constructed rearwardly of the back seat of a conventional automobile, without requiring modification of the automobile.

These and ancillary objects and structural features of merit are attained by this invention, the preferred embodiments of which are set forth in the following description and illustrated in the accompanying drawings, wherein:

Figure 1 is a fragmentary side elevational view of the rear portion of a conventional automobile, with portions thereof being broken away to illustrate a clothes compartment, which is formed rearwardly of the back rest of the back seat of the automobile in a manner in accordance with the principles of this invention;

Figure 2 is a top plan view of the clothes compartment;

Figure 3 is a top plan view, with the closure members removed;

Figure 4 is a rear elevational view thereof;

Figure 5 is a fragmentary vertical sectional view of one of the flexible sections or housings of the compartment;

Figure 6 is a vertical sectional view of one of the compartment sections;

Figure 7 is a fragmentary perspective view of a supporting frame for the clothes compartment formed on the back ledge;

Figure 8 is a fragmentary perspective view of the supporting frame and the upper portion of the compartment;

Figure 9 is an enlarged elevational view of the locking means provided for securing a baffle member transversely between the compartment and the trunk of the vehicle;

Figure 10 is a fragmentary sectional view taken on line 10—10 of Figure 4;

Figure 11 is a perspective view of a mounting means for a protective baffle plate interposed between the trunk of an automobile and the clothes compartment;

Figure 12 is a perspective view of another form of mounting means;

Figure 13 is a fragmentary perspective view of a hanger bar for receiving clothes hangers;

Figure 14 is a perspective view of a hook for a garment hanger, the hook being formed complemental to the hanger bar;

Figure 15 is a fragmentary perspective view of a conventional automobile, with a portion thereof being broken away to illustrate another form of clothes compartment formed rearwardly of the back rest of the back seat of the automobile;

Figure 16 is a side elevational view of the form of clothes compartment illustrated in Figure 15;

Figure 17 is a front elevational view thereof;

Figure 18 is a vertical sectional view of one of the sections of the clothes compartment;

Figure 19 is an enlarged fragmentary sectional view taken on line 19—19 of Figure 18.

Referring now more particularly to the accompanying drawings, and initially to Figures 1 through 5, inclusive, the numeral 10 designates a conventional automobile, which is constructed with a back seat 12, having a back rest 14 and which includes a trunk compartment 16. A clothes compartment 18, constructed in accordance with this invention, is interposed between the back rest 14 and the trunk compartment 16 and depends from the ledge 20, which extends rearwardly from the upper edge of the back rest to the trunk compartment.

The compartment 18 includes a pair of flexible bags or housings 22 and 24, which are arranged in side by side relation, each of which being similarly constructed.

Thus, with respect to the bag 22, as seen in Figure 5, the open upper end 26 thereof is fixedly secured in a rectangular frame 28, which is channel-shaped in cross section and which is formed with a lateral mounting flange 30. The flange 30 is seated on a supporting rail 32, with a rectangular shaped bushing 34 interposed between the flange and the rail. The rail 32 laterally extends from a depending bar 36, which is secured vertically to the shelf 20 and defines an opening 38 in the shelf.

The opening 38 in the ledge, which exposed the interior of the bag 22, is closed by a closure 40, the closure being hinged by a piano hinge 42 to the ledge and being formed with parallel slotted openings 44 and 46 on its free edge, the openings having enlarged centers and receiving locking means 48. The locking means 48 includes a pin 50, which is rotatably carried by the shelf and a peg 52, which extends transversely of the pin, the peg being alignable with the slots in the closure to extend therethrough and being rotatable out of alignment for locking the closure over the opening.

A hanger bar 54 is transversely mounted between the opposing sides 56 and 58 of the frame 36 and is disposed above the open end of the bag. The hanger bar, as seen in Figures 5, 6 and 13, includes an elongated rod 60, which is rectangular in cross section, and which is formed with longitudinally spaced circumferential grooves 62, the opposing ends of the bar being socketed in mounting cups 64 and 66 formed exteriorly on the frame sides 56 and 58.

Hangers 66 are especially designed for use with the hanger bar, the hangers being provided with a hook 68, which includes a connecting leg 70 and a parallel leg 72, the legs being connected by a bight portion 74, the legs and the bight portion being rectangular in cross section and being complemental to the grooves 62, so that the hooks, when disposed in the grooves, have their outer surfaces flush with the outer surfaces of the hanger bar.

A baffle or protector member, which forms a bulkhead between the trunk compartment and the housings is provided, the baffle 76 including a plate 78, which is positioned rearwardly of each of the bags, as seen in Figure 4. The lower ends of the plate are socketed in supporting cups 80, the cups including a base plate 82 and an upstanding socket member 84, which is formed with an open end wall 86 and an open top wall 87. A resilient insert 88 is disposed within the socket and is provided to frictionally receive the lower edge of the baffle member 78. The side walls of the insert are parallel and spaced apart sufficiently to receive the lower edge of the plate.

The upper end of the baffle member is provided with transverse openings 90, which are formed with laterally extending aligned slots 92. A locking pin 94 is disposed through the opening, when the peg 96, transversely carried by the outer end thereof, is aligned with the slots, the peg being movable out of alignment with the slots to lock the pin on the baffle. The inner enlarged head 98 of the pin is rotatably disposed in a complemental opening 100 formed in a plate 102, which depends from the supporting frame for the bag. A spring 104 is concentrically coiled on the pin and a washer 106 serves as an abutment for one end of the spring, the washer being engageable on the outer surface of the plate 102. The spring abuts against the baffle plate 78 to urge the baffle plate outwardly from the frame, the baffle plate being removable through the trunk compartment.

The baffle plate 78 is employed, when the bags 22 and 24 are in use and, when a curved bag 108 is employed, as seen in Figure 6, a curved baffle member 110 is employed, the same having an offset upper end 112, which receives the locking means, as seen in Figure 10. The lower end of the plate 110 is mounted in supporting cups 112, illustrated in Figure 11. The cups 112 include a base plate 114, which is mounted on the floor of the trunk compartment by suitable headed fasteners and an upstanding socket 116, having an open end 118 and upwardly and outwardly slanted and diverging side walls 120 and 122, the side walls being connected by a straight end wall 124. A resilient insert 126 is provided, the insert having side walls formed complemental to the side walls 120 and 122 of the socket and receiving the lower edges of the baffle plate, as seen in Figure 6.

Another form of this invention is illustrated in Figures 15 through 18, the same including a rigid type sectional compartment 130. The rigid compartment 130 includes a pair of side by side sections or housings 132 and 134, each of the housings being similarly formed and including a top wall 136, which forms the ledge rearwardly of the back rest 138 of the back seat. The back rest 138 is hingedly connected by a hinge means 140 to the seat, so that it can be swung forwardly to expose the clothes compartment. The hinge 140 includes a bracket 142, attached to the lower edge of the back rest and an upstanding bracket plate 144, the brackets being triangular shaped and having their minor ends secured by a pivot 146.

The compartment 130 includes a front wall 148, which is spaced by a spacing bar 150 from the seat and which is divided into the sections 132 and 134 by a vertical divider 152. Opposing end walls 154 and 156 are formed integral with the front wall and a back wall 158 and bottom wall 160 are provided. The top wall or ledge 136 is formed with openings 162, within which frames 164 are mounted, the frames supporting transparent plates 166, which enable the interior of the sections of the compartment to be viewed from above the ledge 136.

Each of the sections 132 and 134 is formed with an opening 168, the opening being closed by a closure 170. The closure 170 is secured by a piano hinge 172 to the front wall and is provided at its free end with a spring latch 174, engageable on the front wall. A knob 175 is formed on the outer surface of the closure, so that when the back rest 138 is swung about the pivot 146, the knob can be grasped to open the closure and thereby enable access to be gained to the interior of the sections of the compartment.

Hanger bars 176 are disposed transversely in each of the sections, the hanger bars being positioned between the front and back walls of the compartment. The hanger bars are structurally similar to the hanger bars 60, illustrated in Figure 13, and have their opposing ends 178 and 180 welded, as at 182, to the front and back walls as seen in Figure 19.

Thus, it can be seen that a dustproof clothes compartment is provided, rearwardly of the back rest of the back seat of an automobile and forwardly of the trunk compartment, the housings or sections of the compartment being provided with hanger bars, so that garments suspended from hangers can be disposed therein in a dust and wrinkle proof manner. The baffle members are provided to prevent damage to the housings and to the garments therein by articles disposed in the trunk and the clothes can be easily removed from the compartment interiorly of the automobile.

What is claimed is:

1. A clothes carrier for an automobile having a back seat formed with a back rest and a ledge projecting rearwardly from the back rest comprising a rigid housing formed below the ledge and having opposing front and rear walls, said back rest being hinged to the seat, a hinged closure member formed in the front wall of the housing, said ledge forming a top wall for the housing, a transparent plate in said ledge exposing the interior of the housing and a hanger bar arranged between the front and rear walls above the closure member to receive the hooks of garment hangers.

2. A clothes carrier for an automobile having a back seat formed with a back rest and a ledge projecting rearwardly from the back rest comprising a rigid housing formed below the ledge and having opposing front and rear walls, said back rest being hinged to the seat, a hinged closure member formed in the front wall of the housing, said ledge forming a top wall for the housing, a transparent plate in said ledge exposing the interior of the housing and a hanger bar arranged between the front and rear walls above the closure member to receive the hooks of garment hangers, sockets formed on the opposing front and rear walls and having open confronting ends and top walls and resilient liners in said sockets frictionally receiving the opposing ends of the bar.

3. A clothes carrier for an automobile having a back seat formed with a back rest and a ledge projecting rearwardly from the back rest comprising a flexible housing having an open upper end, said ledge being formed with an opening, a frame depending from the ledge, means affixing the upper end of the housing to the frame so that the open end of the housing communicates with the opening in the ledge, and a closure for said ledge opening.

4. A clothes carrier for an automobile having a back seat formed with a back rest and a ledge projecting rearwardly from the back rest comprising a flexible housing having an open upper end, said ledge being formed with an opening, a frame depending from the ledge, means affixing the upper end of the housing to the frame so that the open end of the housing communicates with the opening in the ledge, a hanger bar transversely mounted in the frame above the housing, a hinged closure for said ledge opening and a baffle plate disposed rearwardly of the housing separating the housing from the trunk compartment of the automobile.

5. A clothes carrier for an automobile having a back seat formed with a back rest and a ledge projecting rearwardly from the back rest comprising a flexible housing having an open upper end, said ledge being formed with an opening, a frame depending from the ledge, means affixing the upper end of the housing to the frame so that the open end of the housing communicates with the opening in the ledge, a hanger bar transversely mounted in the frame above the housing, a hinged closure for said ledge opening and a baffle plate disposed rearwardly of the housing separating the housing from the trunk compartment of the automobile, means for removably mounting the plate on the frame of the automobile and means connecting the plate to the frame on the ledge.

6. A clothes carrier for an automobile having a back seat formed with a back rest and a ledge projecting rearwardly from the back rest comprising a housing open at its top and closed at its bottom positioned below said ledge and having its open top depending from said ledge, there being an opening in said housing permitting access interiorly of the housing, a removable closure for the opening in said housing, and a fixed hanger bar positioned within said housing below and adjacent said ledge for receiving the hooks of hangers.

7. A clothes carrier for an automobile having a back seat formed with a back rest and a ledge projecting rearwardly from the back rest comprising a housing open at its top and closed at its bottom positioned below said ledge and having its open top depending from said ledge, there being an opening in said housing permitting access interiorly of the housing, a removable closure for the opening in said housing, a fixed hanger bar positioned within said housing below and adjacent said ledge for receiving the hooks of hangers, and an upstanding removable baffle member positioned rearwardly of and extending in back of said housing to separate said housing from the trunk compartment of an automobile.

SIMON SENK.

References Cited in the file of this patent

UNITED STATES PATENTS

| Number | Name | Date |
|---|---|---|
| 1,473,161 | Rogers | Nov. 6, 1923 |
| 2,465,770 | Volsk | Mar. 29, 1949 |
| 2,502,963 | Klee | Apr. 4, 1950 |